Oct. 15, 1935.   N. J. ELTER ET AL   2,017,532
DRILL SHARPENING MECHANISM
Original Filed Oct. 11, 1933   2 Sheets-Sheet 1
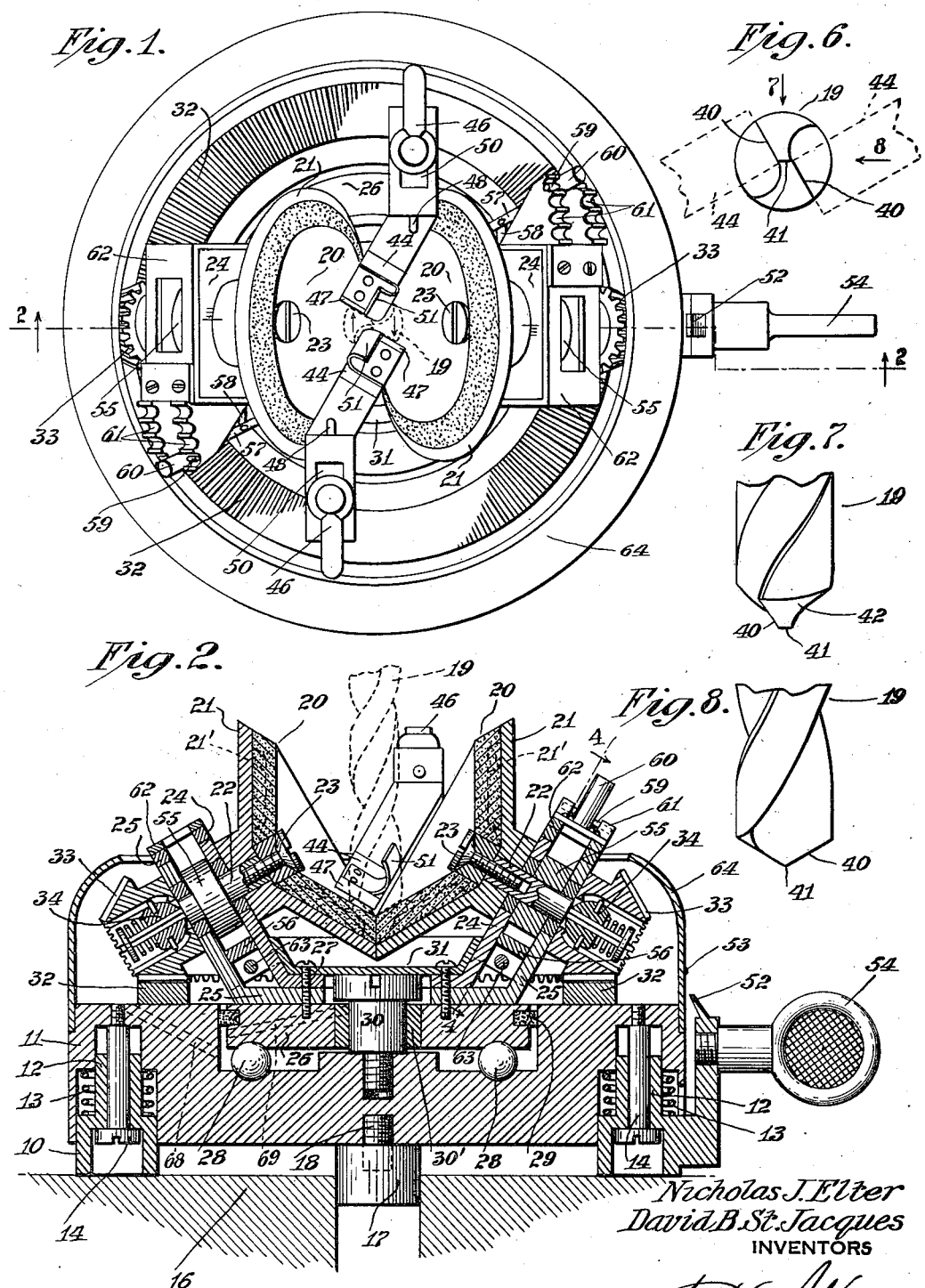
Nicholas J. Elter
David B. St. Jacques
INVENTORS
ATTORNEY Oct. 15, 1935.   N. J. ELTER ET AL   2,017,532
DRILL SHARPENING MECHANISM
Original Filed Oct. 11, 1933   2 Sheets-Sheet 2
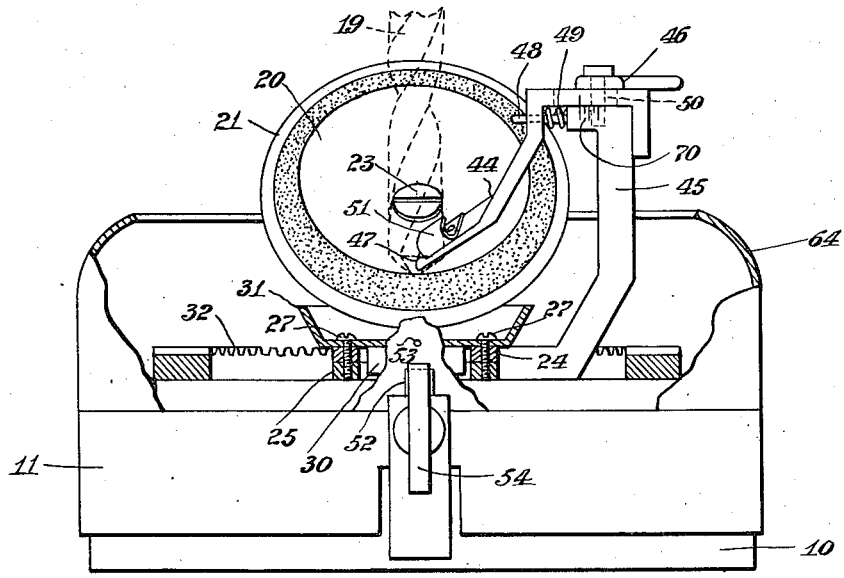
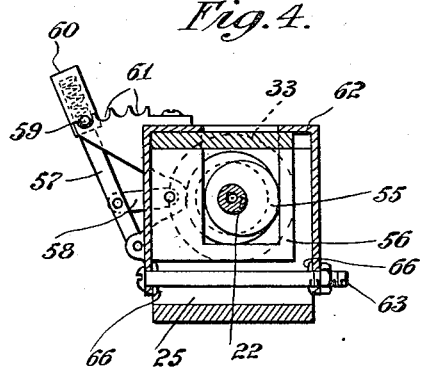  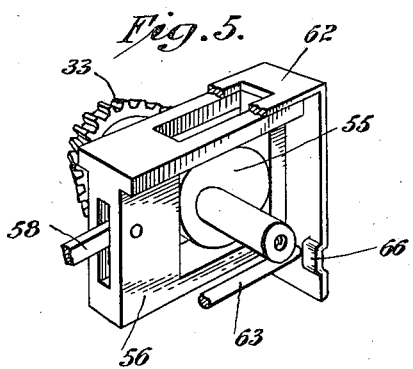
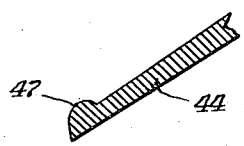
Nicholas J. Elter
David B. St. Jacques
INVENTORS
BY
ATTORNEY Patented Oct. 15, 1935

2,017,532

UNITED STATES PATENT OFFICE 2,017,532

DRILL SHARPENING MECHANISM

Nicholas J. Elter and David B. St. Jacques, New York, N. Y.

Application October 11, 1933, Serial No. 693,058
Renewed February 25, 1935

18 Claims. (Cl. 51—241)

Our invention relates to aparatus for sharpening drills and particularly of the type commonly termed twist drills.

One object is to provide mechanism for automatically and accurately sharpening drills to predetermined standard angles.

Another object is to provide a sharpening attachment which can be inserted in an ordinary drill press or lathe so that the drill may be sharpened without removing it from the machine in which it has been used.

According to present day methods of sharpening drills it is necessary for the mechanic to stop the drill press, remove the drill from the chuck and take the drill to the grind stone or grinding head. The accuracy of the sharpening operation depends very largely upon the personal skill of a mechanic and, in fact, it is practically impossible to sharpen both sides of the drill to the same angle. Even when holders are provided which are supposed to position the drill properly with respect to the grind stone or grinding head there is still left the problem of the personal skill of the mechanic.

After the drill has been sharpened it is necessary for the mechanic to replace it in the drill press and resume his work.

It will be seen from the foregoing that not only is there a great amount of lost time but the drill is not likely to be accurately sharpened. If the inaccuracy is slight it is likely that the drill will be used and result in poor work. If on the other hand, the inaccuracy of the sharpening has been substantial or the mechanic is skilled in detecting errors, the mechanic may realize the inaccuracy of the drill and be obliged to resharpen it until he is able to secure an accurate and perfectly centered sharpened drill.

We have therefore sought to provide a portable device for accurately and automatically sharpening drills in the most expeditious manner.

We have also sought to provide mechanism by means of which the clearance may be varied or adjusted as desired so that the drill may be used either in soft or hard material.

In carrying out our invention we provide a device which is in the form of an attachment adapted to be centered in a drill press or lathe so that the drill can be sharpened without taking it from the machine. The apparatus includes two conical sharpening devices which are driven by the rotation of the drill itself. These sharpening devices are carried by a rotating plate which is geared to the base of the device so that the sharpening devices rotate individually about their own axes and simultaneously about the axis of the drill.

Fig. 1 is a plan view of apparatus embodying one form of our invention.

Fig. 2 is a vertical sectional view of the same on the plane of the line 2—2 of Fig. 1.

Fig. 3 is a side view and partial section of the same.

Fig. 4 is a sectional view taken on the plane of the line 4—4 of Fig. 2 of the support for one of the sharpening stones showing a method of adjustment.

Fig. 5 is a perspective view of a cam arrangement for giving an oscillatory motion to a sharpening stone.

Figs. 6, 7 and 8 are detail views on a larger scale showing the tip end of a drill.

Fig. 9 is a fragmentary sectional view of one of the driving abutments.

The body of the device is preferably formed of two parts 10 and 11 so that the upper part can move vertically with respect to the lower part and for this purpose one part is provided with a number of projecting tubular posts 12 which telescope in the other part and a spring 13 surrounds each post to resiliently support the part 11. The screw 14 connects the two parts to limit the vertical movement of the upper part.

In Fig. 2 we have shown the device mounted on a supporting bed 16 which may be considered as representing the bed of a drill press or the face plate of the lathe chuck. The bed plate will be provided with a central recess in which a centering plug 17 will fit. This plug will be designed to fit the existing central recess or a central recess may be made to fit a given plug. This plug is centered in the part 11 of the attachment by means of a screw stud 18.

The drill 19 is shown dotted in Figs. 1, 2 and 3 and may be of any suitable type. In other words the device is designed to handle various designs of drills. The sharpening stones 20, 20 are of conical form with an included angle at their meeting faces corresponding to the conical angle of the tip of a drill. Each stone is mounted in a cup-like member 21 which in turn is supported on a shaft 22 to which it is secured in any suitable manner as for instance by screw 23. Lugs or flanges 21' may project from the cup members 21 into the stones to transmit driving stresses.

The shaft is supported in a frame consisting of two angular plates 24 and 25 which are connected together and secured to a rotating plate 26 by means of a number of screws 27. This plate 26 is supported on anti-friction bearings 28 in the body plate 11. Packing ring 29 is preferably provided to keep out dirt from the bearings and to retain the supply of oil around the bearings. The plate 26 is secured in place and centered by a central screw 30 with suitable anti-friction bushing 30'. A cup 31 is also preferably provided beneath the adjacent edges of the stones to collect dirt and debris and prevent it from passing down into the bearings. This cup may also be secured in place by the screws 27.

A ring gear 32 is suitably secured to the body part 11 and each of the shafts 22 is provided with a bevel gear 33 which meshes with the teeth of the ring gear. A suitable type of universal connection 34 is preferably provided between the beveled gear and its shaft so as to permit oscillation and displacement of the axis of the shaft 22 with respect to the axis of the gear. This permits the gear 33 to continue in accurate meshing or alignment with the gear 32 and at the same time permits the axis of the shaft and the associated grinder to oscillate as will be presently understood.

The drill herein shown is of the twisted two fluted type and the driving mechanism will accordingly be described with reference to this particular drill. It should be understood, however, that untwisted drills may be sharpened in the same device.

This drill has, of course, two cutting faces 40, 40 and the central part of the drill terminates in a tip 41 which is slightly inclined to the planes of the cutting faces.

In the preferred method of grinding a drill the end is ground back at 42 away from the surface of revolution of the cutting edge to provide adequate clearance so that the cutting edge may properly function.

An abutment member 44 is provided for each of the two cutting edges of the drill. Each abutment member is supported by a post 45 to which it is secured by a clamping member 46 in such a manner so as to permit the abutment members to be adjusted in parallel planes offset to opposite sides of the plane of the meeting edges of the sharpening stones as seen in Fig. 1. The tip 47 of each abutment member is preferably inclined or cam-shaped so as to guide the tip of the drill into position where the abutment ends provide properly spaced faces to receive the opposite sides of the tip of the drill. The angular relation of the abutment members with respect to the tip of the drill is indicated by the dotted lines in Fig. 6.

A guide pin 48 and a spring 49 may be provided to facilitate the adjustment of the abutment arms so that they will accommodate drills of various dimensions. The alignment of each abutment arm 44 and its post 45 may also be aided by a stud and slot connection 50.

Attached to each abutment arm is what we will term an anti-kick-back spring 51 which facilitates the insertion of the drill and serves to resiliently press the cutting edges of the drill against the opposite abutment cams 47 so as to prevent chattering during the grinding or rotating action.

To operate the sharpening device the drill is retracted in the usual manner but without removing it from the machine in which it has been used. The attachment is then centered on the bed of the drill press or in the center of the lathe by means of the centering member 17 which is in axial alignment with the drill. The drill is then lowered until its tip slides into place between the two oppositely disposed cam faces 47 of the abutment arms 44, which are then locked in place by clamping members 46. The drill is then rotated in the usual manner whereupon the drill will drive the carrier plate 26 through the medium of the abutment arms 44 and posts 45. The rotation of this carrier plate and the attached members 24 and 25 causes the rotation of the bevel gears 33 in a planetary manner by reason of their engagement with the stationary ring gear or annulus 32. In this way the attached cup members 21 and the stones 20 are rotated about their individual axes beneath the tip of the drill.

It will thus be seen that the angle of the cutting faces of the drill will depend upon the preformed angle of the meeting edges of the sharpening stones, as seen in Fig. 2.

It will be seen from the previous description that the base part 11 is supported on the springs 13 so that the permissible pressure of the drill against the sharpening surfaces on the stones 20, 20 will depend upon the supporting power of the springs.

We preferably provide a pointer 52 which is carried by the stationary part 10 and which may be used as an index in conjunction with a projection or mark 53 carried by the movable part 11 of the base or by the guard 64 which is mounted on it, the idea being that the operator will pull down on the drill until the mark 53 registers with the tip of the pointer 52 at which time the pressure on the drill will be such amount as may have been predetermined as desirable for the particular drill and stones employed. A series of marks 53 might of course be employed to represent the proper pressure required for different types of stones or different drills. For convenience in handling the attachment and prevent rotation of the base 10 one or more handle members 54 may be employed.

In sharpening drills it is desirable that the cutting edge shall project beyond the adjacent faces of the tip of the drill so that there shall be a clearance which is indicated by the cut back portion 42 shown in Fig. 7. In other words the tip of the drill is not truly conical. This clearance may be formed by causing the axes of the sharpening stones to be oscillated slightly, for instance by means of cams 55 on the shafts 22 of the stone holders. One of these cams is shown in Figs. 4 and 5 with a considerably exaggerated eccentricity.

Each cam rotates in a member 56 which is in the nature of an eccentric abutment. This cam abutment is mounted between the arms 24 and 25 previously described. Normally this cam abutment is stationary so that as the shaft 22 with the cam 55 rotates, the shaft 22 will be compelled to oscillate slightly. This oscillation is timed so that the stones, so to speak, are moved further off center, in the direction of arrows in Fig. 1, as they rotate with respect to the drill, thus grinding back the faces to provide the clearance 42. This oscillating action of the shafts 22 is made possible by the universal connection 34 between the shaft and the bevel gear 33 previously described.

As it is desirable at times to vary the amount of clearance provided, we have constructed the parts so that the eccentric or cam abutment member 56 may be adjusted as shown in Figs. 4 and 5. For this purpose the member 56 is mounted so that it can slide between the members 24 and 25. A lever 57 is hinged to one of the members such as the member 25 and connected by a link 58 to the abutment member 56. By adjusting this lever 57 the position of the abutment member 56 with respect to the bevel gear 33 may be accordingly changed to vary the clearance as above mentioned.

This lever 57 may be held in any one of its adjusted positions for instance by means of a pin 59 carried by a spring pressed finger piece 60 adapted to engage in one of the notches in the edge of the member 61 which is carried by the member 62.

The cam and its abutment are surrounded by a strap member 62 which may be clamped and held in place by a bolt 63 and lock studs or ridges 66.

A guard or shell 64 is also preferably provided to surround the annular gear 32 of the bevel gears 33 to keep out dirt and also for safety reasons.

A suitable system of lubrication is preferably provided to minimize wear of anti-friction bearings 28 and 30. Oil ducts 68 and 69 are shown dotted in Fig. 2. Any suitable filler cup (not shown) may be used to feed passage 68. Inclined passage 69 may be arranged to scoop up oil from around the bearings 28 and deliver it to the bearing for the center screw 30.

In case there is no centering hole for the plug 17 the device may be centered by means of the abutments 47 which can be adjusted to receive the drill top and then used as centering devices. The adjustment of each abutment may be indicated by a scale 70 shown in Fig. 3.

We wish it understood that the foregoing description and accompanying drawings illustrate but one form of construction embodying our invention and that changes in details of construction may be made without departing from the spirit or scope of our invention.

We claim:

1. A drill sharpening attachment comprising a base, a pair of rotatable sharpening devices carried by said base and means actuated by the drill for rotating the sharpening devices about their individual axes and also about the axis of the drill.

2. A drill sharpening attachment comprising a base adapted to be centered in line with the drill to be sharpened, a carrier rotatable on the base, a driving connection between the drill and carrier, two rotatable sharpening cones carried by said carrier and means interposed between said base and cones for rotating the cones about axes inclined to the axis of the drill.

3. A drill sharpener comprising two rotatable inclined stones and means actuated by the drill being sharpened for rotating said stones.

4. A drill sharpener comprising a base, means for resiliently supporting said base, a carrier rotatable on the base, a driving connection between the drill and carrier, a pair of inclined rotatable stones carried by said carrier and means interposed between the base and stones for rotating said stones.

5. A drill sharpening attachment comprising a base having a centering device, a pair of rotatable sharpening devices carried by said base, means actuated by the drill for rotating the sharpening devices about their individual axes and also about the axis of the drill and including drill guides leading to said sharpening devices.

6. A drill sharpening attachment comprising a base adapted to be centered in line with the drill to be sharpened, a carrier rotatable on the base, two rotatable sharpening cones carried by said carrier and rotatable about axes inclined to the axis of the drill and adjustable abutments for the drill inside of said cones.

7. A drill sharpener comprising two rotatable inclined stones, cam-like drill abutments adjacent thereto and means actuated by the drill for rotating said stones.

8. A drill sharpener comprising a base, means for resiliently supporting said base, a carrier rotatable on the base, a driving connection between the drill and carrier, a pair of rotatable stones carried by said carrier, means interposed between the base and stones for rotating the stones and anti-kick back members for the drill being sharpened by said stones.

9. A drill sharpener comprising two cup shaped stones and cam-ended abutments and anti-kick back springs for positioning the tip of a drill and means actuated by the drill and the abutments for rotating the stones.

10. A drill sharpener comprising two rotatable sharpening devices and means actuated by the drill for oscillating them while rotating, so as to automatically provide the desired clearance.

11. A drill sharpener including oppositely disposed inclined sharpening members a rotating support therefor and drill abutments carried by the support and offset to opposite sides of the axis of the drill and adjustable in planes parallel thereto.

12. In a drill sharpening device, a rotatable carrier, a driving connection between the drill and carrier, a pair of inclined rotating drill sharpening devices carried by the carrier, means interposed between the base and sharpening devices for rotating the latter and a receiving cup mounted immediately below the meeting edges thereof.

13. A drill sharpening device including oppositely rotating sharpening stones adapted to receive the thrust of the drill to be sharpened and resilient means for supporting the stones and means for indicating the amount of movement of the stones produced by the pressure of the drill.

14. In a drill sharpening device, oppositely rotating sharpening members and abutment members adjacent thereto and adjustable tangentially with respect to the center web of the drill for the purpose of centering the parts with respect to the drill.

15. Drill sharpening means comprising two rotatable sharpening members with their surfaces arranged to grind the two side portions of a drill means driven by the drill to rotate the sharpening members and means for automatically advancing and retracting said members to form the clearance from the cutting edges.

16. Drill sharpening means comprising two conically cup-like sharpening members with their axes inclined toward each other and toward the axis of the drill to be sharpened, means for rotating the sharpening members individually and as a pair and means for advancing and retracting the said members to automatically form a cutback clearance.

17. A stationary base, a support rotatably carried by said base, an annular gear carried by said base, a pair of sharpening devices carried by said support and geared to said annular gear, and abutments carried by said support whereby the support and the sharpening devices may be rotated by the rotation of the drill.

18. A stationary base, a support rotatably carried by said base, an annular gear carried by said base, a pair of sharpening devices carried by said support and geared to said annular gear, abutments carried by said support whereby the support and the sharpening devices may be rotated by the rotation of the drill and means for resiliently supporting the base against the thrust of the drill.

NICHOLAS J. ELTER.
DAVID B. ST. JACQUES.